United States Patent
Carter et al.

(10) Patent No.: US 11,663,552 B2
(45) Date of Patent: May 30, 2023

(54) DYNAMICALLY CUSTOMIZING A WORKFLOW SEPARATE FROM DOMAIN LOGIC

(71) Applicant: INTERNATIONAL BUSINESS MACHINES CORPORATION, Armonk, NY (US)

(72) Inventors: Mark Carter, Costa Mesa, CA (US); John McEvoy, Trim (IE); Sean Callanan, Dublin (IE); Ava Hakim, Chicago, IL (US); Chris Lynam, Churchtown (IE); Al A. Hamid, Columbus, OH (US); Thomas Harty, Knocklong (IE); William O'Mahony, Lucan (IE)

(73) Assignee: International Business Machines Corporation, Armonk, NY (US)

( * ) Notice: Subject to any disclaimer, the term of this patent is extended or adjusted under 35 U.S.C. 154(b) by 199 days.

(21) Appl. No.: 17/247,512

(22) Filed: Dec. 15, 2020

(65) Prior Publication Data
US 2022/0188770 A1    Jun. 16, 2022

(51) Int. Cl.
*G06Q 10/10* (2023.01)
*G06Q 40/08* (2012.01)
(Continued)

(52) U.S. Cl.
CPC .............. *G06Q 10/10* (2013.01); *G06N 5/043* (2013.01); *G06N 20/00* (2019.01);
(Continued)

(58) Field of Classification Search
None
See application file for complete search history.

(56) References Cited

U.S. PATENT DOCUMENTS

| 7,062,537 B2 | 6/2006 | Aziz |
| 7,299,244 B2 | 11/2007 | Hertling |

(Continued)

FOREIGN PATENT DOCUMENTS

| CA | 2506555 C | 8/2018 |
| CA | 2981380 A1 | 4/2019 |
| JP | 4599364 B2 | 12/2010 |

OTHER PUBLICATIONS

Appian.com; https://www.appian.com; retrieved from the Internet Sep. 24, 2020; 5 pages.

(Continued)

*Primary Examiner* — William J Jacob
(74) *Attorney, Agent, or Firm* — Schmeiser, Olsen & Watts, LLP; Christopher Pignato (57) ABSTRACT

An approach is provided for improving a workflow by using cognitive computing. Inputs about a claim of a claimant are received. The inputs include a history of claims by the claimant, an expected cost of processing the claim, a length of time the claimant has had insurance coverage, governmental requirements associated with the claim, a fraud score associated with the claim, and a ranking and a clustering of previously processed claims. Based on the inputs and using a cognitive computing system, a set of digital workers is selected. The set of digital workers complete step(s) in a current context of a processing of the claim in a workflow. Responsive to completing the step(s), a total number of steps required in the workflow is reduced.

20 Claims, 7 Drawing Sheets

(51) Int. Cl.
*G06Q 50/26* (2012.01)
*G06Q 30/018* (2023.01)
*H04L 51/02* (2022.01)
*G06Q 30/0203* (2023.01)
*G06Q 10/0631* (2023.01)
*G06N 5/043* (2023.01)
*G06N 20/00* (2019.01)
*G06Q 10/0639* (2023.01)

(52) U.S. Cl.
CPC . *G06Q 10/06316* (2013.01); *G06Q 10/06395* (2013.01); *G06Q 30/0185* (2013.01); *G06Q 30/0203* (2013.01); *G06Q 40/08* (2013.01); *G06Q 50/26* (2013.01); *H04L 51/02* (2013.01)

(56) References Cited

U.S. PATENT DOCUMENTS

| | | | |
|---|---|---|---|
| 7,813,944 B1* | 10/2010 | Luk | G06Q 10/10 705/2 |
| 8,359,209 B2* | 1/2013 | McLaughlin | G06Q 40/08 705/2 |
| 10,475,446 B2 | 11/2019 | Gruber | |
| 10,741,185 B2 | 8/2020 | Gruber | |
| 10,748,537 B2 | 8/2020 | Gelfenbeyn | |
| 10,756,991 B2 | 8/2020 | Layman | |
| 10,762,123 B2 | 9/2020 | Venkataraman | |
| 10,848,542 B2 | 11/2020 | Malpass | |
| 2003/0219709 A1* | 11/2003 | Olenick | G06Q 10/10 434/350 |
| 2004/0148214 A1 | 7/2004 | Aziz | |
| 2005/0027546 A1* | 2/2005 | Wiest | G06Q 50/188 705/2 |
| 2007/0282824 A1* | 12/2007 | Ellingsworth | G06F 16/313 707/999.005 |
| 2014/0249865 A1* | 9/2014 | Ghani | G06N 20/00 705/4 |
| 2016/0267396 A1* | 9/2016 | Gray | G06N 20/00 |
| 2018/0204111 A1 | 7/2018 | Zadeh | |
| 2019/0019121 A1 | 1/2019 | Kanala | |
| 2020/0125698 A1 | 4/2020 | Duggal | |
| 2020/0279556 A1 | 9/2020 | Gruber | |
| 2020/0302350 A1 | 9/2020 | Sun | |
| 2021/0358604 A1* | 11/2021 | Kearney | G06N 3/0445 |
| 2022/0351284 A1* | 11/2022 | Cañón Paez | G06Q 30/06 |

OTHER PUBLICATIONS

Artificial intelligence for accident & disaster recover; Tractable.AI; https://tractable.ai/; retrieved from the Internet Oct. 7, 2020; 6 pages.

CMT; New Telematics, AI Product Helps Quickly Detect Crashes; FenderBender.com; Jan. 16, 2020; 11 pages.

Gardiner, Mark; A Car Insurance Claim Estimate Before the Tow Truck is Called; New York Times; Sep. 17, 2020; 3 pages.

Huckster, Rick; Chatbot & The Rise of the Automated Insurance Agent; https://www.the-digital-insurer.com/blog/insurtech-the-rise-of-the-automated-insurance-agent-aka-the-insurtech-chatbot/; retrieved from the Internet Oct. 7, 2020; 8 pages.

Losey, Dylan P. et al.; A Review of Intent Detection, Arbitration, and Communication Aspects of Shred Control for Physical Human-Robot Interaction; Applied Mechanics Reviews; Jan. 2018, vol. 70; 19 pages.

Oakley, John; Collaborative Machines to Enhance Human Capabilities; ICA2 Workshop Report; Feb. 7, 2018; 40 pages.

Omni:us; https://omnius.com/; retrieved from the Internet Sep. 24, 2020; 7 pages.

Singer, Robert; An Ontological Analysis of Business Process Modeling and Execution; arXiv:1905.00499; Apr. 18, 2019; 33 pages.

TDI; InsurTech Directory; https://www.the-digital-insurer.com/search-insurtech-directory; retrieved from the Internet Oct. 7, 2020; 9 pages.

* cited by examiner

DYNAMICALLY CUSTOMIZING A WORKFLOW SEPARATE FROM DOMAIN LOGIC

BACKGROUND

The present invention relates to customizing workflow, and more particularly to using a cognitive approach to separate a reusable business process from a domain specific implementation.

Conventional business workflows are defined to help organizations run in a prescribed way to reach a goal of efficiency. Most current core independent software vendor (ISV) insurance systems simplify and standardize business processes.

Existing artificial intelligence (AI)-based question-and-answer systems help provide customers with fast, straightforward and accurate answers to their questions, across any application, device, or channel. An implementation of a known question-and-answer system has a series of intents, which are starting points for a conversation designed to extract information from a customer. In a chat, the known question-and-answer system matches what the client asks to the closest matching intent, and then responds with programmed text for the selected intent.

SUMMARY

In one embodiment, the present invention provides a computer-implemented method. The method includes receiving, by one or more processors, inputs about a claim of a claimant. The inputs include a history of claims by the claimant, an expected cost of processing the claim, a length of time the claimant has had insurance coverage, governmental requirements associated with the claim, a fraud score indicating a likelihood of fraud associated with the claim, and a ranking and a clustering of previously processed claims. The method further includes based on the inputs and using a cognitive computing system, selecting, by the one or more processors, a set of digital workers that complete one or more steps in a current context of a processing of the claim in a workflow. The method further includes executing, by the one or more processors, the processing of the claim by completing the one or more steps by the selected set of digital workers. The method further includes in response to the execution of the processing of the claim by the completion of the one or more steps by the selected set of digital workers, reducing, by the one or more processors, a total number of steps required in the workflow.

A computer program product and a computer system corresponding to the above-summarized method are also described and claimed herein.

DETAILED DESCRIPTION

Overview

Existing business workflow management approaches are rigid and static, and over time they become inaccurate and outdated, especially as technology changes. Most existing core ISV insurance systems rarely use intelligence and cognitive computing to re-orchestrate the business processes. A traditional automobile insurance claim process is static, where an identical set of steps are executed in sequence for each claim. The resulting data gathered for each claim is similar and built up in the same layered manner.

Further, an existing question-and-answer system that may be used by an existing business workflow management system provides a chat that is always started from the client or customer because the question-and-answer system does not know who the client or customer is or how to contact them. As a result, many conversations in the chat have limited accuracy and the subsequent events are inaccurately directed.

Embodiments of the present invention address the aforementioned unique challenges of the traditional business workflow management approaches by providing a dynamic and cognitive computing-based system that employs a reusable process that is augmented with software-based digital workers for each step in the process. The cognitive computing-based system determines a current context and uses a controller to determine candidate digital worker(s) to complete a given step in the current context. In one embodiment, the identification of the candidate digital worker(s) by the controller uses inputs including, but not limited to, a claimant's claims history, a cost of the claim, a length of time the claimant is covered, state requirements, a fraud score, and a ranking and a clustering of claims. In one embodiment, the cognitive claims system further refines a list of candidate digital workers based on a ranking of the digital workers. The cognitive claims system is continuously learning using feedback to define the ranking of digital workers, where the feedback is from, for example, claim success, cost analysis, claimant feedback, claims handler feedback, and processing time. In one embodiment, the cognitive claims system includes steps to identify the situations in which claims fail (e.g., lack of claim data, fraud, cost too high, etc.) and execute those steps earlier in the process and/or more frequently. For example, if the controller is asked to only find out if the claimant is incapacitated, but the controller also identifies that there is enough information to run a fraud check, then the controller can provide a digital worker to perform the fraud check, which allows an early completion of the process (i.e., a "short circuited" end to the process at a stage in the process that is earlier than when the process would have been completed without the digital worker performing the fraud check).

Embodiments of the present invention address the aforementioned unique challenges of the existing question-and-answer system by providing a framework that allows the question-and-answer system to initiate a conversation. In one embodiment, a novel automobile insurance claim system provides a process in which a question-and-answer system initiates an asking for new information that is required from a customer (e.g., "Are you incapacitated, do you need emergency assistance?", "What is your preferred auto repair shop?", etc.).

Embodiments of the present invention provide intelligent workflows enabled by cognitive computing and automation which redefine how work gets done by removing cost and time factors of manual work and using data to dynamically manage the workflow, thereby augmenting human performance while lowering costs. Furthermore, repetitive and dependent tasks (e.g., fraud checks) are completed earlier and more often during the process. In one embodiment, a new business process is defined for automatically managing low to moderate level automobile claims, which orchestrates the entire lifecycle of a claim—from notification through settlement and from the claimant experience to the employee and claim handler experience. The new business process is designed a generic process that can be used for any insurance client to provide cost savings and improvements in settlement accuracy and customer satisfaction.

As used herein, "cognitive" is defined as pertaining to a system or process that provides AI capabilities that perform machine learning tasks. As used herein, "cognitive" and its variants are not to be construed as being or pertaining to mental processes or concepts performed in the human mind.

System for Dynamically Customizing a Workflow Separate from Domain Logic

Figure 1:
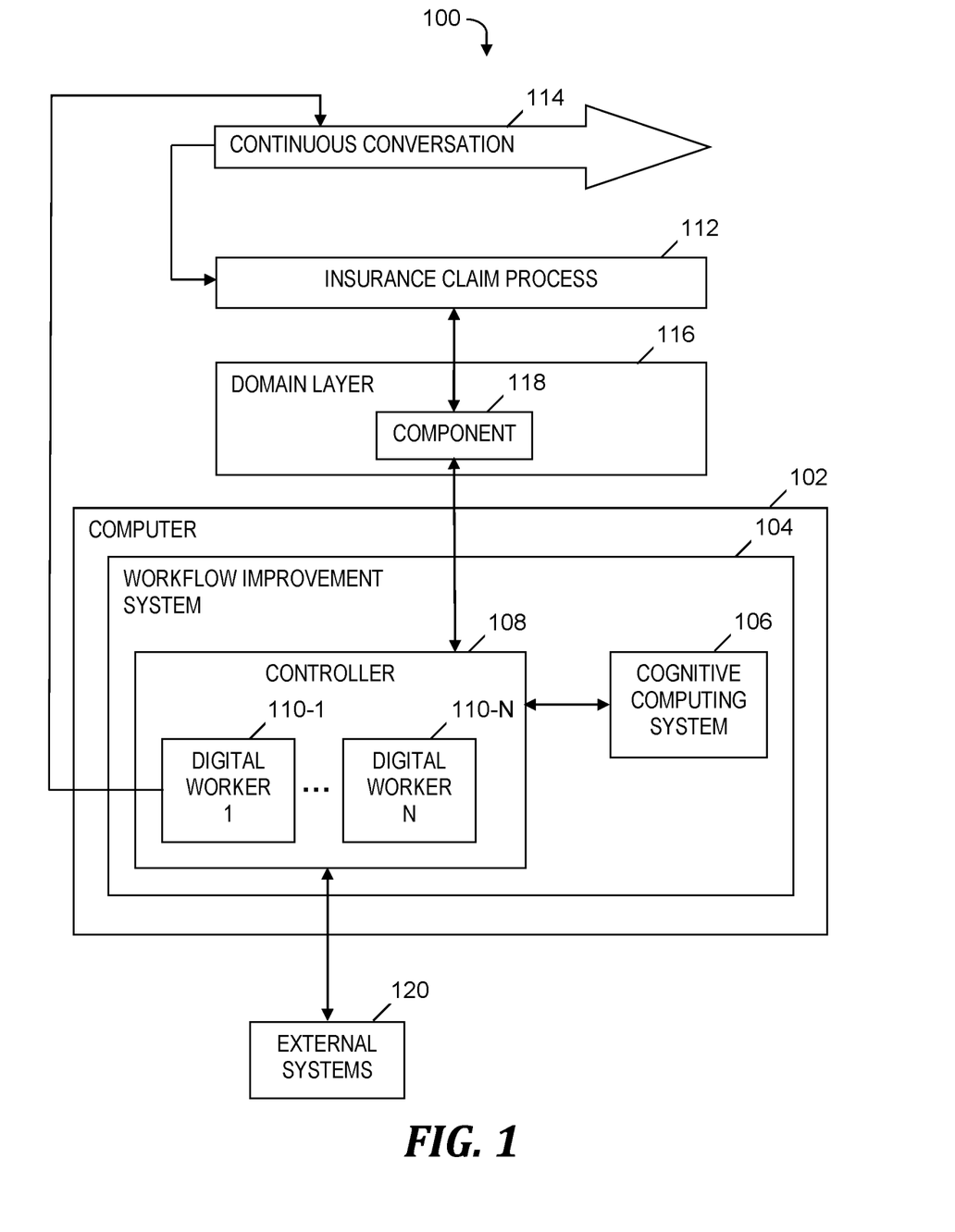
FIG. 1 is a block diagram of a system for dynamically customizing a workflow separate from domain logic, in accordance with embodiments of the present invention.

FIG. 1 is a block diagram of a system 100 for dynamically customizing a workflow separate from domain logic, in accordance with embodiments of the present invention. System 100 includes a computer 102 that includes a software-based workflow improvement system 104, which includes a cognitive computing system 106 and a controller 108. Workflow improvement system 104 dynamically customizes a workflow to provide a reusable business process that is separate from a domain-specific implementation. Controller 108 includes N digital workers: digital worker 110-1, . . . , digital worker 110-N, where N is an integer greater than or equal to one. In one embodiment, digital workers 110-1, . . . , 110-N are implemented by respective microservices.

In one embodiment, workflow improvement system 104 is a cognitive claims system that employs a reusable process that is augmented with digital workers 110-1, . . . , 110-N, and uses controller 108 to determine a set of digital workers selected from digital workers 110-1, . . . , 110-N for a given step in a current context of workflow. In one embodiment, cognitive computing system 106 continuously learns using feedback from prior processing of other claims and uses the continuous learning to rank the digital workers 110-1, . . . , 110-N. In one embodiment, controller 108 refines the set of digital workers selected for a given step of a workflow by using the aforementioned ranking of the digital workers 110-1, . . . , 110-N.

In one embodiment, workflow improvement system 104 identifies steps in a process at which a claim fails (e.g., lack of claim data, fraud associated with the claim, or a cost of claim processing that is too high) and selects digital workers from digital workers 110-1, . . . , 110-N to execute those steps earlier in the overall process and/or more frequently. For example, in a process step that finds out if a claimant is incapacitated, workflow improvement system 104 determines that there is enough information to perform a fraud check and therefore provides a digital worker 110-1 to perform the fraud check, thereby allowing a termination of the overall process to occur earlier in the process.

In one embodiment, a claimant makes an insurance claim to begin an insurance claim process 112. In response to the insurance claim process 112 beginning, a continuous conversation 114 starts and continues between an insurer and the claimant via a chatbot (not shown), which guides the claimant through the insurance claim process 112. Steps (not shown) in the insurance claim process 112 are programmed to call out component 118 and other components (not shown) in domain layer 116 so that the name of a given step in insurance claim process 112 is identical to the name of the component being called in domain layer 116. In response to being called, component 118 invokes controller 108, which decides which digital workers to select from digital workers 110-1, . . . , 110-N and assigns the selected digital workers to a task specified by component 118. The selected digital workers may invoke one or more external systems included in external systems 120 (e.g., detect fraud, notify a mobile application utilized by the claimant, analyze an image, utilize a digital assistant to facilitate the continuous conversation 114, or interact with emergency services, automobile repair services, or automobile rental services).

For example, a step of "is-incapacitated" in insurance claim process 112 for an automobile claim calls component 118, which is also named "is-incapacitated." Controller 108 selects digital workers to present a question of "Are you incapacitated?" by invoking a re-entrant chat via a mobile application included in external systems 120, where the mobile application is utilized by the claimant. Alternatively, the selected digital workers determine whether the claimant is incapacitated by collecting and analyzing data from onboard sensors in the automobile. In the processing of other claims, controller 108 determines that it is not appropriate to gather information at the "is-incapacitated" step and therefore controller 108 assigns a "no-op" digital worker.

The functionality of the components shown in FIG. 1 is described in more detail in the discussion of FIG. 2, FIG. 3, FIG. 4, FIG. 5, FIG. 6, and FIG. 7 presented below.

Process for Dynamically Customizing a Workflow Separate from Domain Logic

Figure 2:
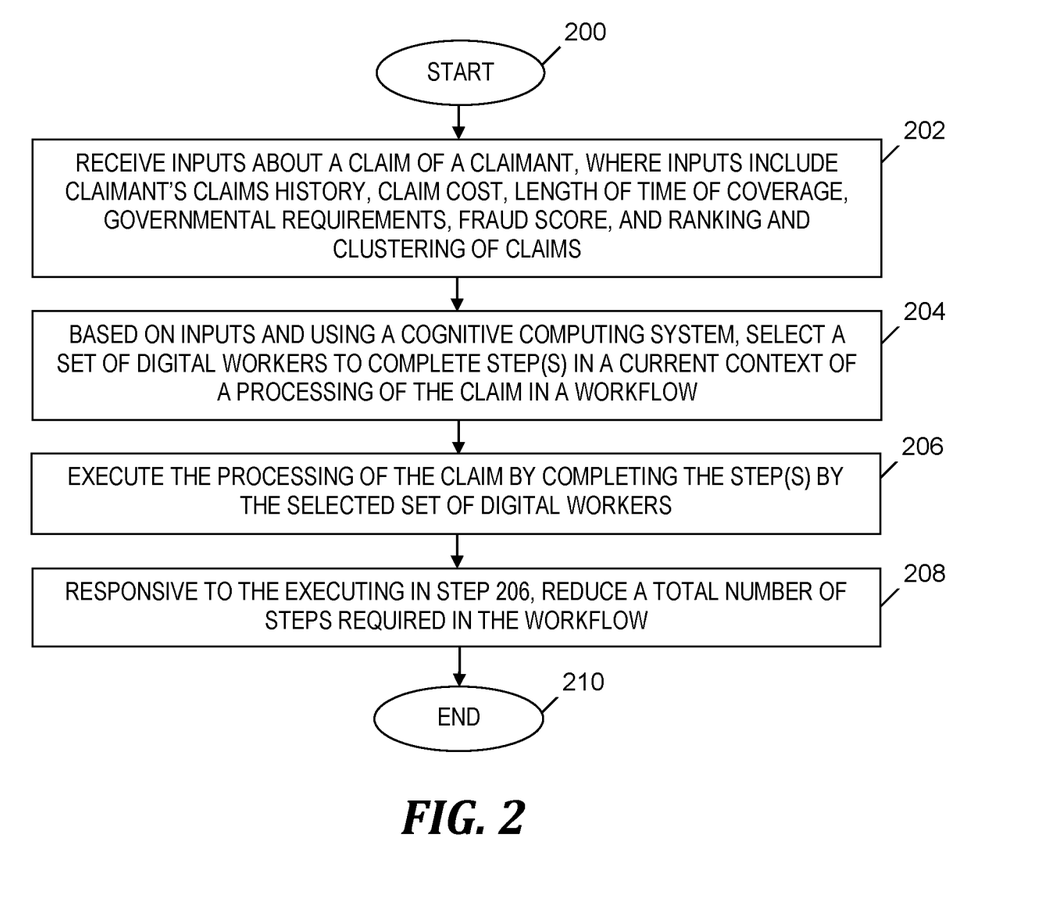
FIG. 2 is a flowchart of a process of dynamically customizing a workflow separate from domain logic, where the process is implemented in the system of FIG. 1, in accordance with embodiments of the present invention.

FIG. 2 is a flowchart of a process of dynamically customizing a workflow separate from domain logic, where the process is implemented in the system of FIG. 1, in accordance with embodiments of the present invention. The process of FIG. 2 begins at a start node 200. In step 202, workflow improvement system 104 (see FIG. 1) receives inputs about a claim of a claimant. The inputs include, but are not limited to, a history of prior claims of the claimant, an expected cost of processing the claim, a length of time that the claimant has been covered by the insurance associated with the claim, state or other governmental requirements associated with the claim, a fraud score indicating a likelihood that the claim is a fraudulent claim, and a ranking and a clustering of other claims. In one embodiment, the aforementioned inputs further include information about weather conditions or other external conditions present at the time of the incident associated with the claim.

In step 204, based on the inputs received in step 202 and using cognitive computing system 106 (see FIG. 1), workflow improvement system 104 (see FIG. 1) selects a set of digital workers from digital worker 110-1, ..., 110-N (see FIG. 1) to complete step(s) in a current context of a processing of the claim in a workflow.

In one embodiment, after step 204 and prior to step 206, cognitive computing system 106 further refines the set of digital workers selected in step 204 by using a ranking of the digital workers. In one embodiment, workflow improvement system 104 ranks digital workers 110-1, ..., 110-N by continuously learning using feedback derived from, but not limited to, whether the processing of a given claim is completed successfully, an analysis of a cost of a given claim, feedback from a claimant of a given claim, feedback from a claims handler who handles a given claim, and an amount of time needed to process a given claim.

In one embodiment, the aforementioned ranking is based on the current context which indicates attributes of the claim, attributes of the claimant, and external conditions such as the current season and weather conditions.

In step 206, workflow improvement system 104 (see FIG. 1) executes the processing of the claim by the step(s) being completed by the set of digital workers that was selected in step 204 or the set of digital workers that was further defined by the aforementioned feedback.

In step 208, responsive to the execution of the processing of the claim in step 206, workflow improvement system 104 (see FIG. 1) reduces a total number of steps required in the workflow.

After step 208, the process of FIG. 2 ends at an end node 210.

Using a Re-Entrant Chat Command

Figure 3:
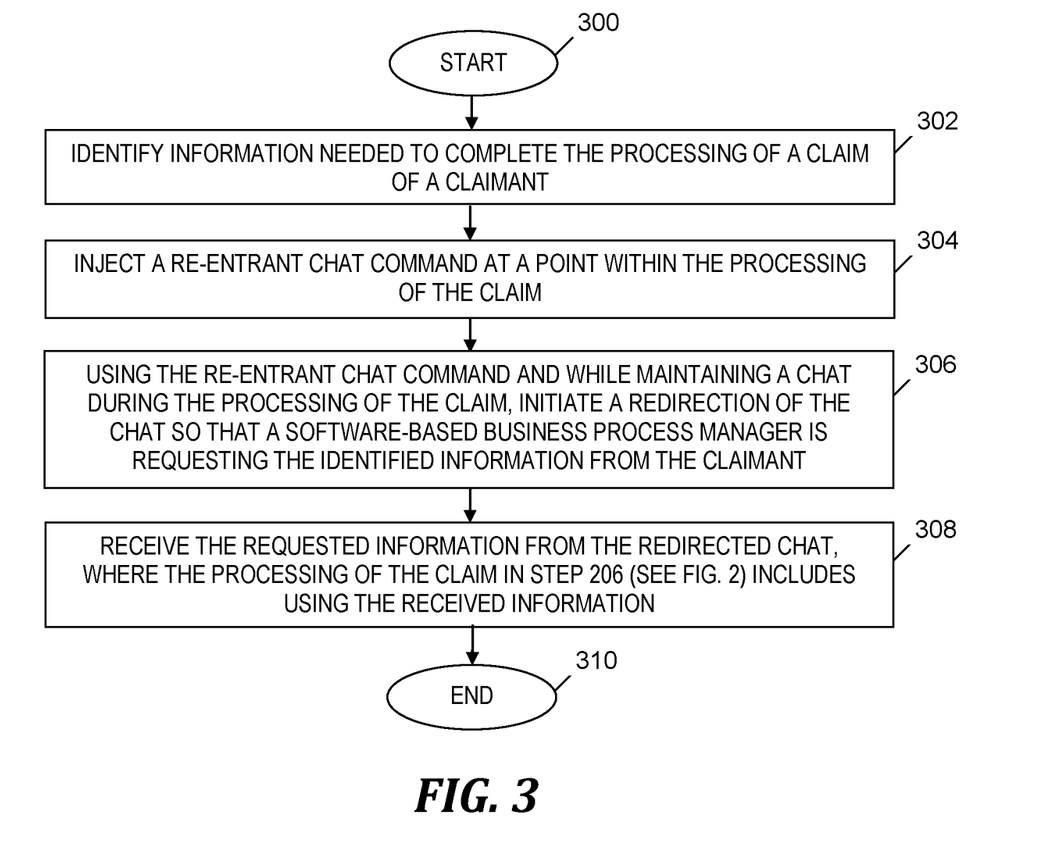
FIG. 3 is a flowchart of a process of using a re-entrant chat command in the process of FIG. 2, where the process of FIG. 3 is implemented in the system of FIG. 1, in accordance with embodiments of the present invention.

FIG. 3 is a flowchart of a process of using a re-entrant chat command in the process of FIG. 2, where the process of FIG. 3 is implemented in the system of FIG. 1, in accordance with embodiments of the present invention. The process of FIG. 3 begins at a start node 300. In step 302, workflow improvement system 104 (see FIG. 1) identifies information needed to complete the processing of a claim of a claimant.

In step 304, workflow improvement system 104 (see FIG. 1) injects a re-entrant chat command at a point within the processing of the claim.

In step 306, using the re-entrant chat command injected in step 304, workflow improvement system 104 (see FIG. 1) initiates a redirection of a chat between a software based business process manager and a device operated by the claimant. The redirected chat includes a request for the information identified in step 302.

In step 308, workflow improvement system 104 (see FIG. 1) receives the information requested in the redirected chat initiated in step 306. The processing of the claim in step 206 (see FIG. 2) includes using the information received in step 308.

After step 308, the process of FIG. 3 ends at an end node 310.

Process Improvements

Figure 4:
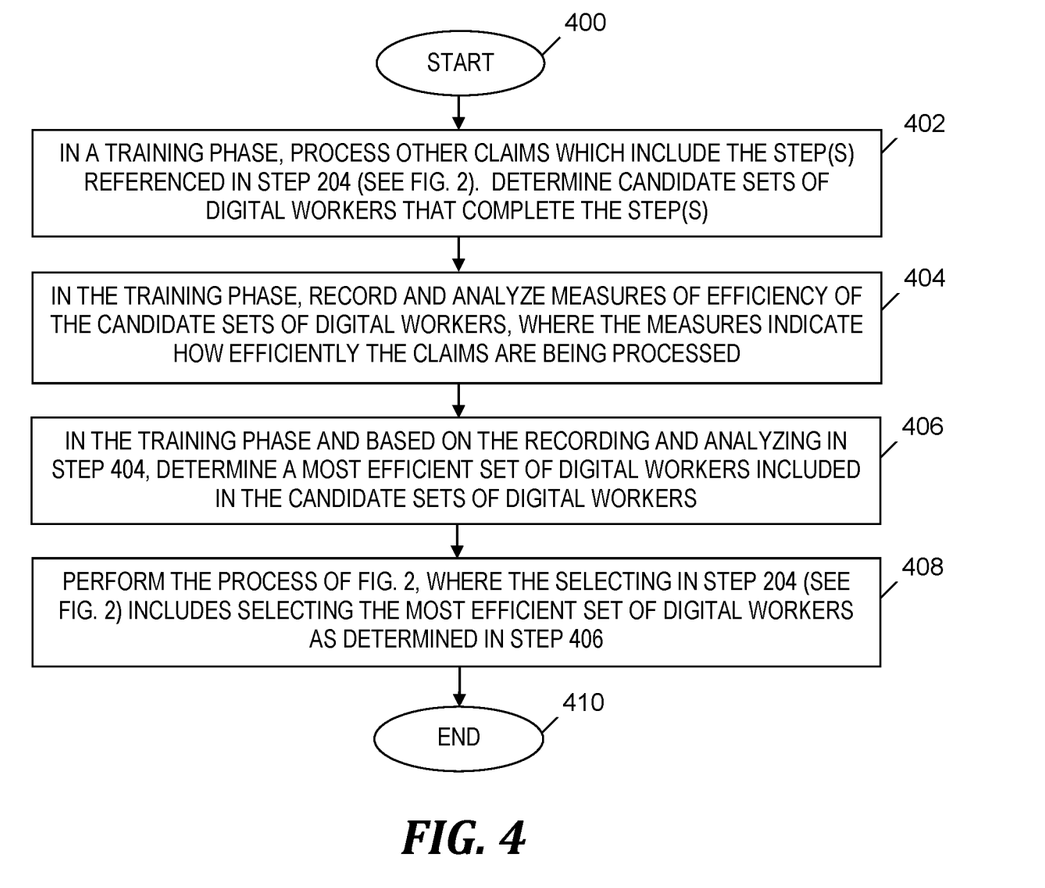
FIG. 4 is a flowchart of a feedback process that improves the process of FIG. 2, where the process of FIG. 4 is implemented in the system of FIG. 1, in accordance with embodiments of the present invention.

FIG. 4 is a flowchart of a feedback process that improves the process of FIG. 2, where the process of FIG. 4 is implemented in the system of FIG. 1, in accordance with embodiments of the present invention. The process of FIG. 4 begins at a start node 400. In step 402, in a training phase, workflow improvement system 104 (see FIG. 1) processes other claims which include the step(s) referenced in step 204 (see FIG. 2). Step 402 also includes workflow improvement system 104 (see FIG. 1) determining candidate sets of digital workers that complete the step(s), where the digital workers in the candidate sets are included in digital workers 110-1, ..., 110-N (see FIG. 1).

In step 404, in the training phase, workflow improvement system 104 (see FIG. 1) records and analyzes measures of efficiency of the candidate sets of digital workers determined in step 402. The measures of efficiency indicate how efficiently claims are being processed given the respective contexts associated with the claims.

In step 406, in the training phase and based on the recording and analyzing in step 404, workflow improvement system 104 (see FIG. 1) determines a most efficient set of digital workers included in the aforementioned candidate sets of digital workers.

In step 408, workflow improvement system 104 (see FIG. 1) performs the process of FIG. 2, where the selecting in step 204 (see FIG. 2) includes selecting the most efficient set of digital workers, as determined in step 406.

Following step 408, the process of FIG. 4 ends at an end node 410.

Figure 5:
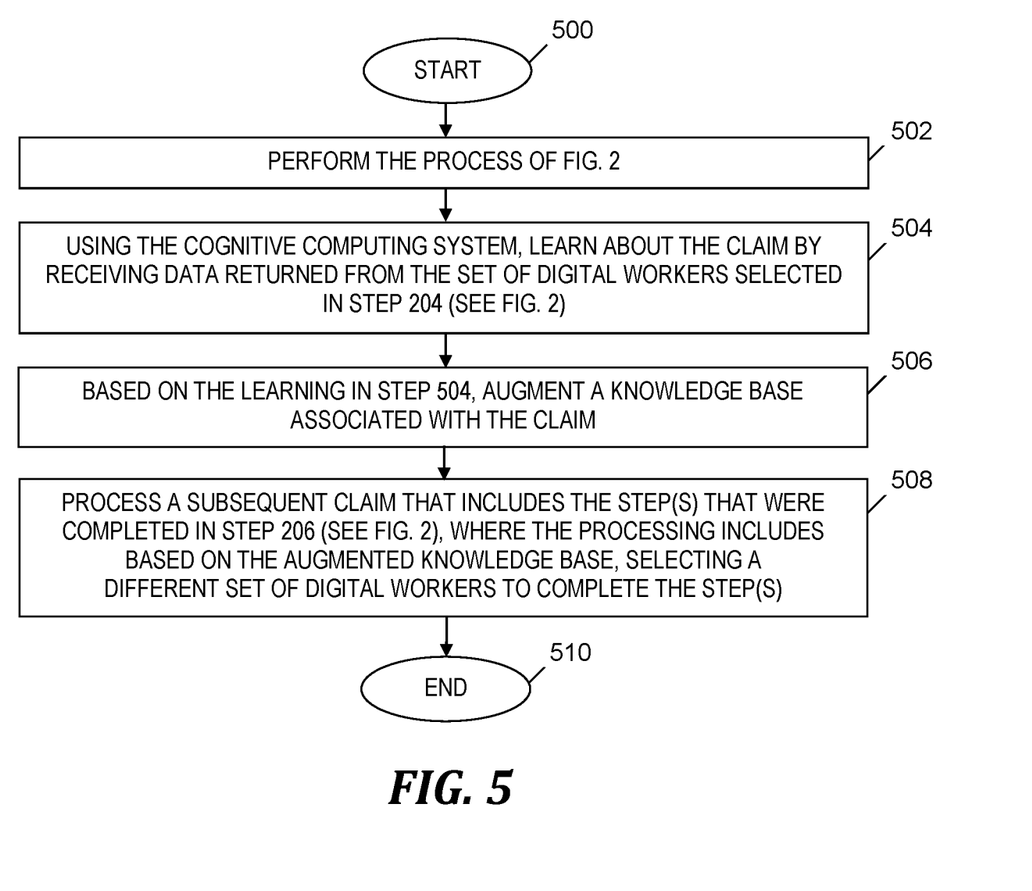
FIG. 5 is a flowchart of a learning process that uses the result of the process of FIG. 2 to improve a processing of a subsequent claim, where the learning process is implemented in the system of FIG. 1, in accordance with embodiments of the present invention.

FIG. 5 is a flowchart of a learning process that uses the result of the process of FIG. 2 to improve a processing of a subsequent claim, where the learning process is implemented in the system of FIG. 1, in accordance with embodiments of the present invention. The process of FIG. 5 begins at a start node 500. In step 502, workflow improvement system 104 (see FIG. 1) performs the process of FIG. 2.

In step 504, using cognitive computing system 106 (see FIG. 1), workflow improvement system 104 (see FIG. 1) learns about the claim by receiving data returned from the set of digital workers selected in step 204 (see FIG. 2).

In step 506, based on the learning in step 504, workflow improvement system 104 (see FIG. 1) augments a knowledge base (not shown in FIG. 1) associated with the claim.

In step 508, workflow improvement system 104 (see FIG. 1) processes a subsequent claim that includes the step(s) that were completed in step 206 (see FIG. 2), where the processing includes based on the knowledge base augmented in step 506, workflow improvement system 104 (see FIG. 1) selects a different set of digital workers to complete the step(s) (i.e., selects a set of digital workers different from the set of digital workers selected in step 204 (see FIG. 2).

After step 508, the process of FIG. 5 ends at an end node 510.

Example

Figure 6:
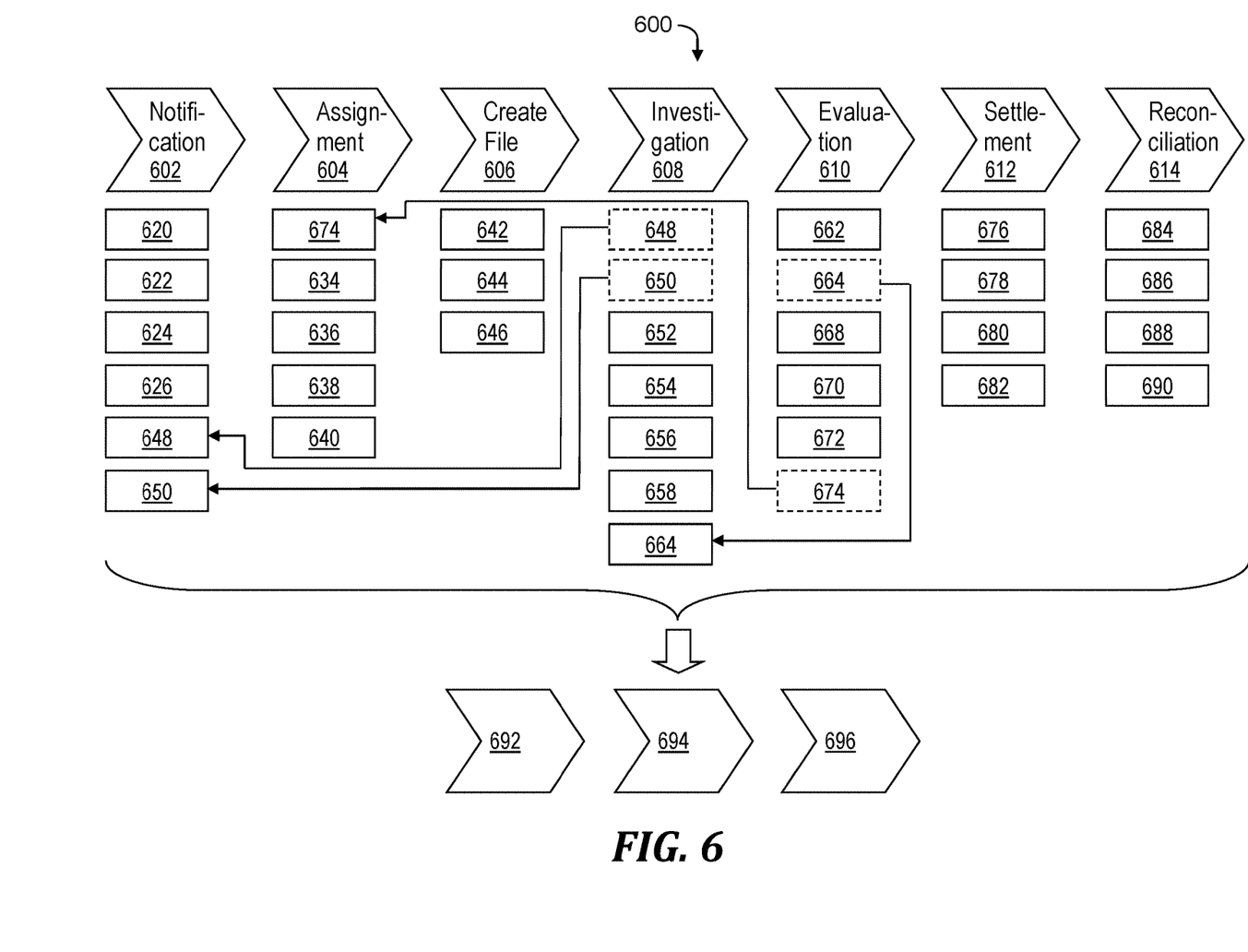
FIG. 6 is an example of using the process of FIG. 2 to reduce the number of steps in a workflow for automobile insurance claims, in accordance with embodiments of the present invention.

FIG. 6 is an example of using the process of FIG. 2 to reduce the number of steps in a workflow for insurance automobile claims, in accordance with embodiments of the present invention. Challenges associated with known approaches to processing insurance automobile claims include rising customer expectations, inefficient and redundant business operations, lack of transparency, complex human decision-making, and high loss ratios. The novel claims processing described herein increase the number of fully automated process steps and the number of activities that have cognitive capabilities, and provide a better customer experience, a shorter claims lifecycle, faster recovery reimbursement, improved quality and consistency of decision-making, reduced claims leakage, reduced reassignment of claims, consistent claims handling for every claim, and target processes shifted to earlier points in the overall claims process.

Example 600 includes an initial series of seven steps in a claims and servicing portion of an insurance value chain. The series of seven steps consists of notification 602, assignment 604, create file 606, investigation 608, evaluation 610, settlement 612, and reconciliation 614. In an initial configuration, the step of notification 602 includes activities 620, 622, 624, and 626 (e.g., ID caller, first notice of loss (FNOL), loss facts, and inquiry information).

The step of assignment 604 initially includes activities 634, 636, 638, and 640 (e.g., triage, claim assignment, repair assignment, and inspection method). The step of create file 606 initially includes activities 642, 644, and 646 (e.g., open file, set loss reserve, and set expense reserve).

The step of investigation 608 initially includes activities 648, 650, 652, 654, 656, and 658. Activity 648 includes Validate Coverage and activity 650 includes Fraud and Subrogation Decisions. The step of evaluation 610 initially includes activities 662, 664, 668, 670, 672, and 674. Activity 664 includes Decide Liability and activity 674 includes Valid Claim.

The step of settlement 612 initially includes activities 676, 678, 680, and 682. The step of reconciliation 614 initially includes activities 684, 686, 688, and 690.

Using step 204 in FIG. 2, controller 108 (see FIG. 1) selects digital workers so that activity 648 (i.e., Validate Coverage) and activity 650 (i.e., Fraud and Subrogation Decisions) are moved from the step of investigation 608 to the earlier step of notification 602. The aforementioned selection of digital workers also moves activity 664 (i.e., Decide Liability) from the step of evaluation 610 to the earlier step of investigation 608, and also moves activity 674 (i.e., Valid Claim) from the step of evaluation 610 to the earlier step of assignment 604.

Furthermore, the workflow improvement system 104 (see FIG. 1) uses the process of FIG. 2 to re-orchestrate the workflow associated with processing the insurance automobile claim in example 600, so that the seven steps 602, 604, 606, 608, 610, 612, and 614 are reduced to a series of only three steps 692, 694, and 696.

Computer System

Figure 7:
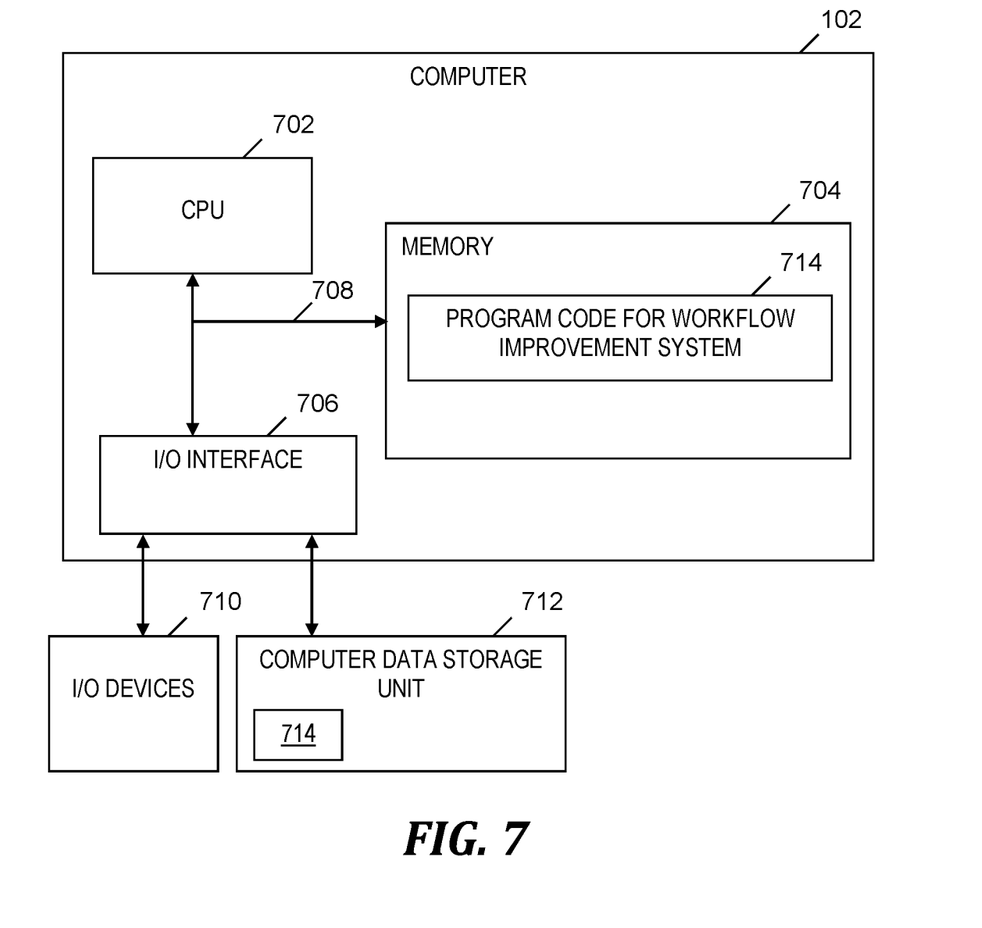
FIG. 7 is a block diagram of a computer that is included in the system of FIG. 1 and that implements the processes of FIG. 2, FIG. 3, FIG. 4, and FIG. 5, in accordance with embodiments of the present invention.

FIG. 7 is a block diagram of a computer that is included in the system of FIG. 1 and that implements the processes of FIG. 2, FIG. 3, FIG. 4, and FIG. 5, in accordance with embodiments of the present invention. Computer 102 is a computer system that generally includes a central processing unit (CPU) 702, a memory 704, an input/output (I/O) interface 706, and a bus 708. Further, computer 102 is coupled to I/O devices 710 and a computer data storage unit 712. CPU 702 performs computation and control functions of computer 102, including executing instructions included in program code 714 for workflow improvement system 104 (see FIG. 1) to perform a method of dynamically customizing a workflow separate from domain logic, where the instructions are executed by CPU 702 via memory 704. CPU 702 may include a single processing unit or processor or be distributed across one or more processing units or one or more processors in one or more locations (e.g., on a client and server).

Memory 704 includes a known computer readable storage medium, which is described below. In one embodiment, cache memory elements of memory 704 provide temporary storage of at least some program code (e.g., program code 714) in order to reduce the number of times code must be retrieved from bulk storage while instructions of the program code are executed. Moreover, similar to CPU 702, memory 704 may reside at a single physical location, including one or more types of data storage, or be distributed across a plurality of physical systems or a plurality of computer readable storage media in various forms. Further, memory 704 can include data distributed across, for example, a local area network (LAN) or a wide area network (WAN).

I/O interface 706 includes any system for exchanging information to or from an external source. I/O devices 710 include any known type of external device, including a display, keyboard, etc. Bus 708 provides a communication link between each of the components in computer 102, and may include any type of transmission link, including electrical, optical, wireless, etc.

I/O interface 706 also allows computer 102 to store information (e.g., data or program instructions such as program code 714) on and retrieve the information from computer data storage unit 712 or another computer data storage unit (not shown). Computer data storage unit 712 includes one or more known computer readable storage media, where a computer readable storage medium is described below. In one embodiment, computer data storage unit 712 is a non-volatile data storage device, such as, for example, a solid-state drive (SSD), a network-attached storage (NAS) array, a storage area network (SAN) array, a magnetic disk drive (i.e., hard disk drive), or an optical disc drive (e.g., a CD-ROM drive which receives a CD-ROM disk or a DVD drive which receives a DVD disc).

Memory 704 and/or storage unit 712 may store computer program code 714 that includes instructions that are executed by CPU 702 via memory 704 to dynamically customize a workflow separate from domain logic. Although FIG. 7 depicts memory 704 as including program code, the present invention contemplates embodiments in which memory 704 does not include all of code 714 simultaneously, but instead at one time includes only a portion of code 714.

Further, memory 704 may include an operating system (not shown) and may include other systems not shown in FIG. 7.

In one embodiment, computer data storage unit 712 includes a data repository operatively coupled to workflow improvement system 104 (see FIG. 1).

As will be appreciated by one skilled in the art, in a first embodiment, the present invention may be a method; in a second embodiment, the present invention may be a system; and in a third embodiment, the present invention may be a computer program product.

Any of the components of an embodiment of the present invention can be deployed, managed, serviced, etc. by a service provider that offers to deploy or integrate computing infrastructure with respect to dynamically customizing a workflow separate from domain logic. Thus, an embodiment of the present invention discloses a process for supporting computer infrastructure, where the process includes providing at least one support service for at least one of integrating, hosting, maintaining and deploying computer-readable code (e.g., program code 714) in a computer system (e.g., computer 102) including one or more processors (e.g., CPU 702), wherein the processor(s) carry out instructions contained in the code causing the computer system to dynamically customize a workflow separate from domain logic. Another embodiment discloses a process for supporting computer infrastructure, where the process includes integrating computer-readable program code into a computer system including a processor. The step of integrating includes storing the program code in a computer-readable storage device of the computer system through use of the processor. The program code, upon being executed by the processor, implements a method of dynamically customizing a workflow separate from domain logic.

While it is understood that program code 714 for dynamically customizing a workflow separate from domain logic may be deployed by manually loading directly in client, server and proxy computers (not shown) via loading a computer-readable storage medium (e.g., computer data storage unit 712), program code 714 may also be automatically or semi-automatically deployed into computer 102 by sending program code 714 to a central server or a group of central servers. Program code 714 is then downloaded into client computers (e.g., computer 102) that will execute program code 714. Alternatively, program code 714 is sent directly to the client computer via e-mail. Program code 714 is then either detached to a directory on the client computer or loaded into a directory on the client computer by a button on the e-mail that executes a program that detaches program code 714 into a directory. Another alternative is to send program code 714 directly to a directory on the client computer hard drive. In a case in which there are proxy servers, the process selects the proxy server code, determines on which computers to place the proxy servers' code, transmits the proxy server code, and then installs the proxy server code on the proxy computer. Program code 714 is transmitted to the proxy server and then it is stored on the proxy server.

Another embodiment of the invention provides a method that performs the process steps on a subscription, advertising and/or fee basis. That is, a service provider can offer to create, maintain, support, etc. a process of dynamically customizing a workflow separate from domain logic. In this case, the service provider can create, maintain, support, etc. a computer infrastructure that performs the process steps for one or more customers. In return, the service provider can receive payment from the customer(s) under a subscription and/or fee agreement, and/or the service provider can receive payment from the sale of advertising content to one or more third parties.

The present invention may be a system, a method, and/or a computer program product at any possible technical detail level of integration. The computer program product may include a computer readable storage medium (or media) (i.e., memory 704 and computer data storage unit 712) having computer readable program instructions 714 thereon for causing a processor (e.g., CPU 702) to carry out aspects of the present invention.

The computer readable storage medium can be a tangible device that can retain and store instructions (e.g., program code 714) for use by an instruction execution device (e.g., computer 102). The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions (e.g., program code 714) described herein can be downloaded to respective computing/processing devices (e.g., computer 102) from a computer readable storage medium or to an external computer or external storage device (e.g., computer data storage unit 712) via a network (not shown), for example, the Internet, a local area network, a wide area network and/or a wireless network. The network may comprise copper transmission cables, optical transmission fibers, wireless transmission, routers, firewalls, switches, gateway computers and/or edge servers. A network adapter card (not shown) or network interface (not shown) in each computing/processing device receives computer readable program instructions from the network and forwards the computer readable program instructions for storage in a computer readable storage medium within the respective computing/processing device.

Computer readable program instructions (e.g., program code 714) for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations (e.g., FIG. 2, FIG. 3, FIG. 4, and FIG. 5) and/or block diagrams (e.g., FIG. 1 and FIG. 7) of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions (e.g., program code 714).

These computer readable program instructions may be provided to a processor (e.g., CPU 702) of a general purpose computer, special purpose computer, or other programmable data processing apparatus (e.g., computer 102) to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium (e.g., computer data storage unit 712) that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions (e.g., program code 714) may also be loaded onto a computer (e.g. computer 102), other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A computer-implemented method comprising:
processing, by one or more processors, insurance claims of respective claimants, wherein the processing includes checking whether the insurance claims are fraudulent during a second processing step that is subsequent to a first processing step, and wherein a termination of the processing of a given insurance claim included in the insurance claims during the processing and based on the given insurance claim being fraudulent is performed after the second processing step;
determining, by the one or more processors, (i) costs and amounts of time required to process the insurance claims, (ii) feedback from the respective claimants about processing the insurance claims, and (iii) feedback from claims handlers who handle the insurance claims;
learning, by a cognitive computing system, to improve a processing of a subsequent insurance claim of a claimant, the learning based on the costs and the amounts of time required to process the insurance claims, the feedback from the respective claimants, and the feedback from the claims handlers;
subsequent to the processing the insurance claims, receiving, by the one or more processors, inputs about the subsequent insurance claim of the claimant, the inputs including a history of claims by the claimant, an expected cost of the processing of the subsequent insurance claim, a length of time the claimant has had insurance coverage, governmental requirements associated with the subsequent insurance claim, a fraud score indicating a likelihood of fraud associated with the subsequent insurance claim, and a ranking and a clustering of previously processed insurance claims;
based on the learning by the cognitive computing system and based on the inputs, selecting, by the one or more processors, a set of digital workers for a processing of the subsequent insurance claim, which includes checking whether the subsequent insurance claim is fraudulent during the first processing step instead of the second processing step;
determining, by the set of digital workers and during the first processing step, that the subsequent insurance claim is fraudulent; and
in response to the subsequent insurance claim being fraudulent, terminating, by the one or more processors, the processing of the subsequent insurance claim prior to the second processing step.

2. The method of claim 1, further comprising:
identifying, by the one or more processors, information needed to complete the processing of the subsequent insurance claim;
injecting, by the one or more processors, a re-entrant chat command at a point in the processing of the subsequent insurance claim; and
using the re-entrant chat command, initiating, by the one or more processors, a conversation from a business process manager that manages the processing of the subsequent insurance claim to a device operated by the claimant, wherein the conversation includes a request for the identified information.

3. The method of claim 1, further comprising:
in a training phase, processing, by the one or more processors, other insurance claims which include one or more steps included in a current context of the processing of the subsequent insurance claim, the one or more steps being completed by the set of digital workers, the processing of the other insurance claims including determining a plurality of candidate sets of digital workers that complete the one or more steps in respective contexts of a processing of the other insurance claims, each of the respective contexts matching the current context;
in the training phase, recording and analyzing, by the one or more processors, respective measures of efficiency of the candidate sets of digital workers, the measures of efficiency indicating how efficiently respective insurance claims included in the other insurance claims are being processed; and
in the training phase and based on the recording and the analyzing of the measures of efficiency in processing the respective insurance claims, determining, by the one or more processors, a most efficient set of digital workers included in the candidate sets of digital workers, the most efficient set of digital workers providing a processing of a given insurance claim included in the other insurance claims that is more efficient than respective processing of any insurance claim other than the given insurance claim included in the other insurance claims, wherein the selecting the set of digital workers includes selecting the most efficient set of digital workers from the candidate sets of digital workers.

4. The method of claim 3, further comprising determining, by the one or more processors, a measure of efficiency for the given insurance claim included in the other insurance claims, wherein the measure of efficiency for the given insurance claim is based on a factor selected from the group consisting of an amount of time for a completion of the one or more steps in a processing of the given insurance claim, an amount of a payout for the given insurance claim, and feedback from a given claimant associated with the given insurance claim, the feedback being given during or at a completion of the processing of the given insurance claim.

5. The method of claim 1, further comprising:
using the cognitive computing system, learning, by the one or more processors, about the subsequent insurance claim by receiving data returned from the set of digital workers;
based on the learning about the subsequent insurance claim, augmenting, by the one or more processors, a knowledge base associated with the subsequent insurance claim; and
processing, by the one or more processors, a second subsequent insurance claim that includes the one or more steps, wherein the processing the second subsequent insurance claim includes selecting a different set of digital workers based on the augmented knowledge base and completing the one or more steps by the different set of digital workers.

6. The method of claim 1, further comprising:
based on the current context of the subsequent insurance claim, determining, by the one or more processors and using the cognitive computing system, that a movement of a step included in the processing of the subsequent insurance claim to an earlier portion of the processing of the subsequent insurance claim provides a reduction in an amount of time needed to complete the processing of the subsequent insurance claim;
moving, by the one or more processors, the step to the earlier portion of the processing of the subsequent insurance claim; and
based on the moved step, reducing the amount of time needed to complete the processing of the subsequent insurance claim.

7. The method of claim 6, wherein the step moved to the earlier portion of the processing of the subsequent insurance claim includes a detection of fraud associated with the subsequent insurance claim, a lack of data about the subsequent insurance claim, or a cost of processing the subsequent insurance claim that exceeds a threshold amount.

8. The method of claim 1, further comprising:
providing at least one support service for at least one of creating, integrating, hosting, maintaining, and deploying computer readable program code in the computer, the program code being executed by a processor of the computer to implement the processing the insurance claims, the determining (i) the costs and amounts of time required to process the insurance claims, (ii) the feedback from the respective claimants, and (iii) the feedback from the claims handlers, the learning to improve the processing of the subsequent insurance claim, the receiving the inputs about the subsequent insurance claim, the selecting the set of digital workers, the determining that the subsequent insurance claim is fraudulent, and the terminating the processing of the subsequent insurance claim.

9. A computer program product for improving a workflow by using cognitive computing, the computer program product comprising:
one or more computer readable storage media having computer readable program code collectively stored on the one or more computer readable storage media, the computer readable program code being executed by a central processing unit (CPU) of a computer system to cause the computer system to perform a method comprising:
the computer system processing insurance claims of respective claimants, wherein the processing includes checking whether the insurance claims are fraudulent during a second processing step that is subsequent to a first processing step, and wherein a termination of the processing of a given insurance claim included in the insurance claims during the processing and based on the given insurance claim being fraudulent is performed after the second processing step;
the computer system determining (i) costs and amounts of time required to process the insurance claims, (ii) feedback from the respective claimants about processing the insurance claims, and (iii) feedback from claims handlers who handle the insurance claims;
a cognitive computing system learning to improve a processing of a subsequent insurance claim of a claimant, the learning based on the costs and the amounts of time required to process the insurance claims, the feedback from the respective claimants, and the feedback from the claims handlers, the cognitive computing system being included in the computer system;
the computer system receiving, subsequent to the processing the insurance claims, inputs about the subsequent insurance claim of the claimant, the inputs including a history of claims by the claimant, an expected cost of the processing of the subsequent insurance claim, a length of time the claimant has had insurance coverage, governmental requirements associated with the subsequent insurance claim, a fraud score indicating a likelihood of fraud associated with the subsequent insurance claim, and a ranking and a clustering of previously processed insurance claims;
based on the learning by the cognitive computing system and based on the inputs, the computer system selecting a set of digital workers for a processing of the subsequent insurance claim, which includes checking whether the subsequent insurance claim is fraudulent during the first processing step instead of the second processing step;
the computer system determining, by using the set of digital workers and during the first processing step, that the subsequent insurance claim is fraudulent; and
in response to the subsequent insurance claim being fraudulent, the computer system terminating the processing of the subsequent insurance claim prior to the second processing step.

10. The computer program product of claim 9, wherein the method further comprises:
the computer system identifying information needed to complete the processing of the subsequent insurance claim;
the computer system injecting a re-entrant chat command at a point in the processing of the subsequent insurance claim; and
using the re-entrant chat command, the computer system initiating a conversation from a business process manager that manages the processing of the subsequent insurance claim to a device operated by the claimant, wherein the conversation includes a request for the identified information.

11. The computer program product of claim 9, wherein the method further comprises:
in a training phase, the computer system processing other insurance claims which include one or more steps included in a current context of the processing of the subsequent insurance claim, the one or more steps being completed by the set of digital workers, the processing of the other insurance claims including determining a plurality of candidate sets of digital workers that complete the one or more steps in respective contexts of a processing of the other insurance claims, each of the respective contexts matching the current context;
in the training phase, the computer system recording and analyzing respective measures of efficiency of the candidate sets of digital workers, the measures of efficiency indicating how efficiently respective insurance claims included in the other insurance claims are being processed; and
in the training phase and based on the recording and the analyzing of the measures of efficiency in processing the respective insurance claims, the computer system determining a most efficient set of digital workers included in the candidate sets of digital workers, the most efficient set of digital workers providing a processing of a given insurance claim included in the other insurance claims that is more efficient than respective processing of any insurance claim other than the given insurance claim included in the other insurance claims,
wherein the selecting the set of digital workers includes selecting the most efficient set of digital workers from the candidate sets of digital workers.

12. The computer program product of claim 11, wherein the method further comprises the computer system determining a measure of efficiency for the given insurance claim included in the other insurance claims, wherein the measure of efficiency for the given insurance claim is based on a factor selected from the group consisting of an amount of time for a completion of the one or more steps in a processing of the given insurance claim, an amount of a payout for the given insurance claim, and feedback from a given claimant associated with the given insurance claim, the feedback being given during or at a completion of the processing of the given insurance claim.

13. The computer program product of claim 9, wherein the method further comprises:
using the cognitive computing system, the computer system learning about the subsequent insurance claim by receiving data returned from the set of digital workers;
based on the learning about the subsequent insurance claim, the computer system augmenting a knowledge base associated with the subsequent insurance claim; and
the computer system processing a second subsequent insurance claim that includes the one or more steps, wherein the processing the second subsequent insurance claim includes selecting a different set of digital workers based on the augmented knowledge base and completing the one or more steps by the different set of digital workers.

14. The computer program product of claim 9, wherein the method further comprises:
based on the current context of the claim and using the cognitive computer system, the computer system determining that a movement of a step included in the processing of the subsequent insurance claim to an earlier portion of the processing of the subsequent insurance claim provides a reduction in an amount of time needed to complete the processing of the subsequent insurance claim;
the computer system moving the step to the earlier portion of the processing of the subsequent insurance claim; and
based on the moved step, the computer system reducing the amount of time needed to complete the processing of the subsequent insurance claim.

15. A computer system comprising:
a central processing unit (CPU);
a cognitive computing system;
a memory coupled to the CPU; and
one or more computer readable storage media coupled to the CPU, the one or more computer readable storage media collectively containing instructions that are executed by the CPU via the memory to implement a method of improving a workflow by using cognitive computing, the method comprising:
the computer system processing insurance claims of respective claimants, wherein the processing includes checking whether the insurance claims are fraudulent during a second processing step that is subsequent to a first processing step, and wherein a termination of the processing of a given insurance claim included in the insurance claims during the processing and based on the given insurance claim being fraudulent is performed after the second processing step;
the computer system determining (i) costs and amounts of time required to process the insurance claims, (ii) feedback from the respective claimants about processing the insurance claims, and (iii) feedback from claims handlers who handle the insurance claims;
the cognitive computing system learning to improve a processing of a subsequent insurance claim of a claimant, the learning based on the costs and the amounts of time required to process the insurance claims, the feedback from the respective claimants, and the feedback from the claims handlers, the cognitive computing system being included in the computer system;
the computer system receiving, subsequent to the processing the insurance claims, inputs about the subsequent insurance claim of the claimant, the inputs including a history of claims by the claimant, an expected cost of the processing of the subsequent insurance claim, a length of time the claimant has had insurance coverage, governmental requirements associated with the subsequent insurance claim, a fraud score indicating a likelihood of fraud associated with the subsequent insurance claim, and a ranking and a clustering of previously processed insurance claims;

based on the learning by the cognitive computing system and based on the inputs, the computer system selecting a set of digital workers for a processing of the subsequent insurance claim, which includes checking whether the subsequent insurance claim is fraudulent during the first processing step instead of the second processing step;

the computer system determining, by using the set of digital workers and during the first processing step, that the subsequent insurance claim is fraudulent; and in response to the subsequent insurance claim being fraudulent, the computer system terminating the processing of the subsequent insurance claim prior to the second processing step.

16. The computer system of claim 15, wherein the method further comprises:

the computer system identifying information needed to complete the processing of the subsequent insurance claim;

the computer system injecting a re-entrant chat command at a point in the processing of the subsequent insurance claim; and using the re-entrant chat command, the computer system initiating a conversation from a business process manager that manages the processing of the subsequent insurance claim to a device operated by the claimant, wherein the conversation includes a request for the identified information.

17. The computer system of claim 15, wherein the method further comprises:

in a training phase, the computer system processing other insurance claims which include one or more steps included in a current context of the processing of the subsequent insurance claim, the one or more steps being completed by the set of digital workers, the processing of the other insurance claims including determining a plurality of candidate sets of digital workers that complete the one or more steps in respective contexts of a processing of the other insurance claims, each of the respective contexts matching the current context;

in the training phase, the computer system recording and analyzing respective measures of efficiency of the candidate sets of digital workers, the measures of efficiency indicating how efficiently respective insurance claims included in the other insurance claims are being processed; and in the training phase and based on the recording and the analyzing of the measures of efficiency in processing the respective insurance claims, the computer system determining a most efficient set of digital workers included in the candidate sets of digital workers, the most efficient set of digital workers providing a processing of a given insurance claim included in the other insurance claims that is more efficient than respective processing of any insurance claim other than the given insurance claim included in the other insurance claims, wherein the selecting the set of digital workers includes selecting the most efficient set of digital workers from the candidate sets of digital workers.

18. The computer system of claim 17, wherein the method further comprises the computer system determining a measure of efficiency for the given insurance claim included in the other insurance claims, wherein the measure of efficiency for the given insurance claim is based on a factor selected from the group consisting of an amount of time for a completion of the one or more steps in a processing of the given insurance claim, an amount of a payout for the given insurance claim, and feedback from a given claimant associated with the given insurance claim, the feedback being given during or at a completion of the processing of the given insurance claim.

19. The computer system of claim 15, wherein the method further comprises:

using the cognitive computing system, the computer system learning about the subsequent insurance claim by receiving data returned from the set of digital workers;

based on the learning about the subsequent insurance claim, the computer system augmenting a knowledge base associated with the subsequent insurance claim; and the computer system processing a second subsequent insurance claim that includes the one or more steps, wherein the processing the second subsequent insurance claim includes selecting a different set of digital workers based on the augmented knowledge base and completing the one or more steps by the different set of digital workers.

20. The computer system of claim 15, wherein the method further comprises:

based on the current context of the claim and using the cognitive computing system, the computer system determining that a movement of a step included in the processing of the subsequent insurance claim to an earlier portion of the processing of the subsequent insurance claim provides a reduction in an amount of time needed to complete the processing of the subsequent insurance claim;

the computer system moving the step to the earlier portion of the processing of the subsequent insurance claim; and based on the moved step, the computer system reducing the amount of time needed to complete the processing of the subsequent insurance claim.

* * * * *